United States Patent
Wischnewskiy et al.

(10) Patent No.: US 9,479,088 B2
(45) Date of Patent: Oct. 25, 2016

(54) METHOD AND DEVICE FOR ELECTRICALLY EXCITING AN ACTUATOR FOR AN ULTRASONIC MOTOR

(75) Inventors: Wladimir Wischnewskiy, Waldbronn (DE); Alexej Wischnewskij, Wörth (DE)

(73) Assignee: Physik Instrumente (PI) GmbH & Co. KG, Karlsruhe (DE)

(*) Notice: Subject to any disclaimer, the term of this patent is extended or adjusted under 35 U.S.C. 154(b) by 626 days.

(21) Appl. No.: 13/877,235

(22) PCT Filed: Sep. 28, 2011

(86) PCT No.: PCT/DE2011/050037
§ 371 (c)(1),
(2), (4) Date: Aug. 8, 2013

(87) PCT Pub. No.: WO2012/048691
PCT Pub. Date: Apr. 19, 2012

(65) Prior Publication Data
US 2013/0307440 A1    Nov. 21, 2013

(30) Foreign Application Priority Data
Oct. 1, 2010 (DE) .......... 10 2010 047 280

(51) Int. Cl.
*H02N 2/06* (2006.01)
*H02N 2/00* (2006.01)

(52) U.S. Cl.
CPC .............. *H02N 2/06* (2013.01); *H02N 2/008* (2013.01)

(58) Field of Classification Search
CPC . H01L 41/042; H01L 41/044; H01L 41/107; H02N 2/025

USPC .................. 310/316.01, 317, 318
See application file for complete search history.

(56) References Cited

U.S. PATENT DOCUMENTS 5,214,339 A    5/1993  Naito
5,461,273 A    10/1995 Kawasaki et al.
(Continued)

FOREIGN PATENT DOCUMENTS

DE    102006054597 A1    5/2008
WO    2007082601 A1      7/2007
WO    2009109606 A1      9/2009

OTHER PUBLICATIONS

English Translation of DE 10 2006054597, Wischnewskiy.*

*Primary Examiner* — Shawki S Ismail
*Assistant Examiner* — Bryan Gordon
(74) *Attorney, Agent, or Firm* — Pierce Atwood LLP; Kevin M. Farrell; David J. Wilson

(57) ABSTRACT

A method for electrically exciting a piezoelectric actuator of an ultrasonic motor is described. The ultrasonic motor has at least one acoustic standing wave generator, including an exciter electrode and a general electrode, wherein a capacitance $C_0$ is developed between the exciter electrode and the general electrode. The method includes: applying a rectangular exciter voltage $U_g$ to the exciter electrode and the general electrode of the acoustic standing wave generator; providing a voltage $U_g$ with the aid of a feedback element; separating a voltage $u_p$ from a voltage $u_c$ with the aid of a pulse filter; and changing the frequency of the rectangular exciter voltage in such a way that the phase shift between the piezoelectric current $I_p$ and the rectangular exciter voltage $U_g$ is substantially zero. A device for electrically exciting a piezoelectric actuator of an ultrasonic motor is also described.

14 Claims, 12 Drawing Sheets

(56) References Cited

U.S. PATENT DOCUMENTS

| | | |
|---|---|---|
| 5,479,063 A | 12/1995 | Suganuma |
| 5,872,418 A | 2/1999 | Wischnewskiy |
| 6,400,063 B2* | 6/2002 | Iino .................... H02N 2/166 310/316.02 |
| 2003/0111933 A1* | 6/2003 | Gallmeyer ............ H01L 41/042 310/317 |
| 2005/0012432 A1* | 1/2005 | Murphy ................ H01L 41/042 310/316.01 |
| 2005/0225202 A1* | 10/2005 | Vogeley ................ H01L 41/042 310/317 |
| 2010/0013353 A1* | 1/2010 | Wischnewskij ...... H01L 41/083 310/317 |
| 2010/0264234 A1* | 10/2010 | Marchetti ............. H01L 41/042 239/102.2 |
| 2011/0050035 A1* | 3/2011 | Wischnewskiy ...... H01L 41/083 310/317 |
| 2011/0260988 A1* | 10/2011 | Colgate .................. G06F 3/016 345/173 |

* cited by examiner

METHOD AND DEVICE FOR ELECTRICALLY EXCITING AN ACTUATOR FOR AN ULTRASONIC MOTOR

CROSS REFERENCE TO RELATED APPLICATIONS

The present application is a national stage entry according to 35 U.S.C. §371 of PCT application No.: PCT/DE2011/050037, filed Sep. 28, 2011 which claims the benefit of the filing date of German Patent Application No. DE 10 2010 047 280.8 filed on Oct. 1, 2010.

TECHNICAL FIELD

The present invention relates to a method and a device for electrically exciting an actuator for an ultrasonic motor.

BACKGROUND

Patent documents U.S. Pat. No. 5,214,339, U.S. Pat. No. 5,461,273 and U.S. Pat. No. 5,479,063 disclose, for example, a method and a device for exciting the actuator of an ultrasonic wave motor. In the method described in these cases, the frequency of the electrical voltage of the excited ultrasonic actuator is regulated by maintaining a constant phase difference between the exciter voltage and the voltage that is generated by the auxiliary electrode arranged on the piezo-element of the ultrasonic actuator.

The disadvantage of this method and the corresponding excitation device is that the phase difference between the electrical excitation voltage of the actuator and the voltage of the auxiliary electrode depends on the mechanical load on the actuator. Therefore, under the influence of high mechanical loads on the ultrasonic actuator, in these motors the frequency of the electrical excitation voltage is not equal to the mechanical resonant frequency of the ultrasonic actuator. This has a destabilizing effect on the functioning of the ultrasonic motor. In addition, for safe operation the auxiliary electrode must have a large surface area, which in turn reduces the surface area for the exciter electrodes and implies an increase in the excitation voltage. The auxiliary electrode must also have an additional output in the form of a thin wire. When the movable element is moving at high speeds this reduces the operational safety of the motor.

In addition, for example from U.S. Pat. No. 5,872,418, a method and a device for exciting an ultrasonic motor are known, in which the frequency of the electrical excitation voltage of the ultrasonic actuator is regulated by a constant phase difference being maintained between the voltage exciting the actuator and the current flowing through said actuator. In this method and the corresponding device a sinusoidal electrical voltage which stimulates the ultrasonic actuator is applied to the piezo-element of the ultrasonic actuator. The applied sinusoidal voltage causes a sinusoidal current to flow through the piezo-element.

The disadvantage of this method is also the fact that the phase difference between the electrical excitation voltage and the current flowing through the piezo-element depends on the mechanical load on the ultrasonic actuator. This is due to the fact that the sinusoidal current flowing through the piezo-element has two components, namely a capacitive current which flows through the electrical capacitance of the piezo-element, and a piezoelectric current which is determined by the angle of rotation of the domains of the piezo-element. At the mechanical resonant frequency, the piezoelectric current represents a so-called active current, or effective current. When there is a small mechanical load on the ultrasonic actuator, the active resistance of the actuator is significantly smaller than its reactive resistance. Therefore, the phase shift between the excitation voltage and the current flowing through the piezo-element at the mechanical resonant frequency is small and approaches zero. When the mechanical load applied to the actuator increases, the active resistance is increased, while the reactive resistance remains constant. The increase in the mechanical load therefore causes an increase in the phase angle between the excitation voltage and the current flowing through the piezo-element of the ultrasonic actuator.

SUMMARY

In ultrasonic motors with a good friction contact between the ultrasonic actuator and an element to be driven by the ultrasonic actuator, when an increase in the mechanical load occurs the phase shift angle can increase from a few degrees by a factor of ten or more. The oscillations of the phase shift in this case are not only caused by a mechanical load on the element to be driven, but also by undulation in the friction surface and by a mechanical imbalance in the element to be driven.

In motors in which the frequency of the sinusoidal electrical excitation voltage of the ultrasonic actuator is regulated by a constant phase difference being maintained between the phase of this voltage and the phase of the sinusoidal current of the piezo-element, this leads to destabilization of the functioning of the ultrasonic motor.

As a consequence of this destabilization the excitation voltage increases and the required current and power increase. In addition, oscillations in the velocity of the element to be driven occur. The maximum force that can be generated by the motor is reduced. This force depends on the location of the element to be driven. When a large load is applied the motor can come to a stop and the actuator can heat up. The aforementioned heating restricts the temperature range over which the ultrasonic motor can be used.

The object of the invention, therefore, is to provide a method of exciting the actuator of an ultrasonic motor, and a corresponding excitation device, by means of either of which it is possible to increase the stability of the motor, to decrease the required excitation voltage, to reduce the current required and the electrical power and to extend the temperature range when the actuator is under high mechanical loads.

The abovementioned objective is achieved by a method for electrically exciting an actuator for an ultrasonic motor with the features of claim 1 and a device for electrically exciting an actuator for an ultrasonic motor with the features of claim 3. Advantageous embodiments can be obtained from the dependent claims.

The basic idea underlying the invention is to separate the piezoelectric current flowing through the actuator from the capacitive charging current of the actuator and to use the phase shift of the separated piezoelectric current for regulating the frequency of the excitation voltage of the ultrasonic actuator.

In the following, the terms 'actuator for an ultrasonic motor', 'ultrasonic actuator' or simply 'actuator', are used synonymously.

The invention creates a method for electrically exciting an actuator for an ultrasonic motor with a mechanical resonance frequency $F_m$, wherein the ultrasonic motor has at least one acoustic standing wave generator comprising an exciter electrode and a general electrode, wherein an electrical capacitance $C_0$ is formed between the exciter electrode and the general electrode. In the method according to the invention a rectangular excitation voltage $U_g$ is applied to the exciter electrode and the general electrode of the at least one acoustic standing wave generator, wherein the frequency of the rectangular excitation voltage differs from the mechanical resonant frequency $F_m$ of the actuator. Then, by means of a feedback element an electrical voltage $u_g$ is supplied, wherein the electrical voltage $u_g$ is proportional to a current $I_g$ flowing through the standing wave generator, and the current $I_g$ is a total current formed by the sum of a piezoelectric current $I_p$ and a charging and discharging current $I_c$ of the electrical capacitance $C_0$. This is followed by the step of separating an electrical voltage $u_p$ from the electrical voltage $u_c$ by means of an impulse filter, wherein the electrical voltage $u_p$ is proportional to the piezoelectric current $I_p$ and the electrical voltage $u_c$ is proportional to the charging and discharging current $I_c$ of the electrical capacitance $C_0$. Finally, the frequency of the rectangular excitation voltage is changed such that the phase difference between the piezoelectric current $I_p$ and the rectangular excitation voltage $U_g$ is substantially zero.

A device according to the invention for electrically exciting a piezoelectric actuator of an ultrasonic motor, wherein the actuator has at least one acoustic standing wave generator, comprises at least one power amplifier, a feedback element, a filter and a control voltage shaping device. The at least one power amplifier is designed as a voltage selector switch for a supply voltage of the actuator, wherein the voltage selector switch is directly or indirectly connected to the at least one acoustic standing wave generator. In addition the feedback element is connected in series with the acoustic standing wave generator, so that the same current flows through this as flows through the standing wave generator, and the filter is designed as an impulse filter for the electrical voltage that is generated by the feedback element. Moreover, an output of the filter is connected to an input of the control voltage shaping device and the control voltage shaping device is connected to an input of the at least one power amplifier.

The method and/or the device according to the invention enable the optimum frequency of the excitation voltage for the ultrasonic actuator to be maintained. This frequency is held constantly equal to the mechanical resonant frequency of the actuator, independently of the loads acting on the actuator of the ultrasonic motor, which increases the operational stability of the ultrasonic motor. The ultrasonic motor thus always works in an optimal operating range. This reduces the level of the excitation voltage, the current and the power required are reduced, and the motor heats up to a lesser degree.

According to one advantageous design of the method according to the invention, the piezoelectric current $I_p$ flowing through the standing wave generator is stabilized in addition. This allows the vibration velocity of the wave generated in the actuator and hence the velocity of motion of the element to be driven is also stabilized in addition.

According to one advantageous design of the device according to the invention, the voltage selector switch is designed as a half-bridge power amplifier or as a bridge power amplifier or as a dual-clock power amplifier. This makes it possible to significantly reduce the internal resistance of the voltage selector switch and thereby to shorten the pulse duration of the capacitive charging and discharging current $I_c$ as much as possible.

It can be advantageous if the feedback element has a low effective resistance value or comprises a measuring transformer for an electrical current. This allows the phase errors in the conversion of the current $I_g$ into the voltage $U_g$ to be significantly reduced.

It can also be advantageous if the impulse filter is implemented as a bandpass filter, tuned to the mechanical resonant frequency $F_m$ of the actuator, for the voltage generated by the feedback element. The implementation of the impulse filter 23 as a band pass filter 33 enables the phase errors at the mechanical resonant frequency $F_m$ to be eliminated.

It can prove convenient if the impulse filter is implemented as a low-pass filter or as an integrator for the voltage generated by the feedback element. This results in an extremely simple design of the impulse filter.

In addition, it may also prove advantageous if the impulse filter comprises a circuit breaker for the voltage generated by the feedback element, and a control input of the circuit breaker is connected to the voltage selector switch via an edge detector.

It can also be advantageous if the impulse filter is implemented as a voltage comparator.

Furthermore, it can be advantageous if that the device for electrically exciting a piezoelectric actuator of an ultrasonic motor is implemented as an autogenerator.

It may be an advantage if the control voltage shaping device comprises a phase detector and a controlled generator for a rectangular voltage.

It can also be an advantage if the control voltage shaping device has a symmetrical PWM modulator. By use of a symmetrical PWM modulator it is possible to regulate the current $I_p$ and hence the velocity of motion of the element to be driven.

In addition, it can be an advantage if the device for electrically exciting a piezoelectric actuator of an ultrasonic motor has a regulator for the electrical voltage which feeds the power amplifier. This also allows the current $I_p$ and hence the velocity of motion of the element to be driven to be regulated.

It can prove convenient if the device for electrically exciting a piezoelectric actuator of an ultrasonic motor has a stabilization system for the piezoelectric current flowing through the standing wave generator.

In addition, it can be convenient if the electronic components of the device for electrically exciting a piezoelectric actuator of an ultrasonic motor are partially or completely implemented by a programmable digital processor of the DSP (Digital Signal Processor) or FPGA (Field Programmable Gate Array) type. This makes it possible to simplify the design of the electrical excitation device and hence to reduce the costs thereof, and at the same time to increase its immunity to interference.

BRIEF DESCRIPTION OF THE DRAWINGS

Shown in schematic form and not true-to-scale are.

DETAILED DESCRIPTION

Figure 1:
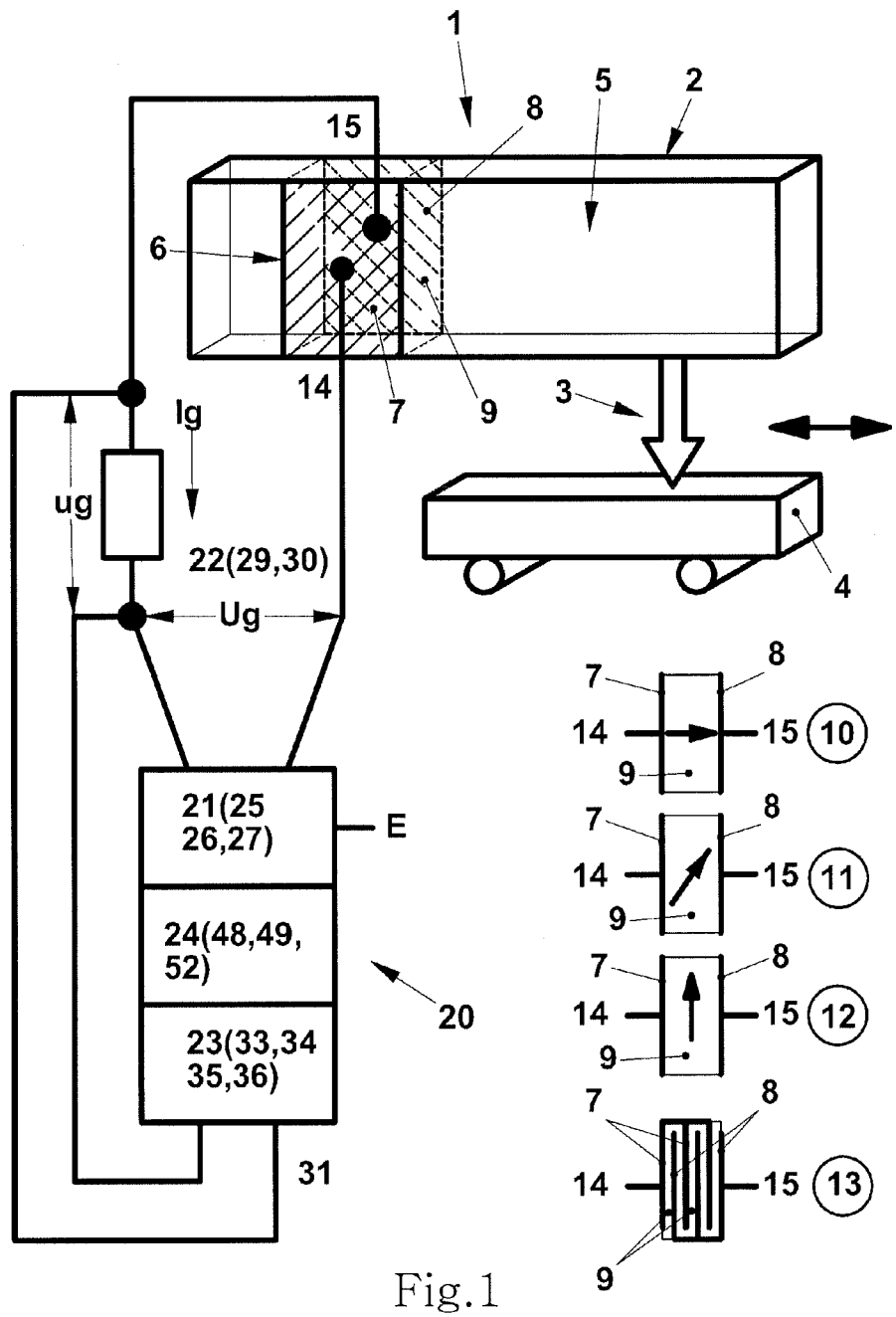
FIG. 1: excitation device according to the invention for the actuator of an ultrasonic motor; (illustrations 10 to 12: different orientations of the polarization vector in relation to the electrodes for a three-layer structure of the actuator; illustration 13: actuator in a multilayer design)

FIG. 1 shows an excitation device according to the invention for an ultrasonic actuator 2 of an ultrasonic motor 1. In this ultrasonic wave motor 1 the ultrasonic actuator 2 is connected by means of a friction connection or a friction contact 3 to an element 4 to be driven, which executes a linear or rotary motion.

The actuator 2 consists of an acoustic resonator 5 implemented in the form of a plate, but which can also be implemented as a disc, as a cylinder or in any other form specified by the construction of the ultrasonic actuator 2. The resonator 5 consists of piezo-ceramic material, but can also be made of metal, oxide ceramic, metal ceramic, a monocrystalline material or another material with high mechanical Q-factor. The resonator 5 can form a closed or an open waveguide for the acoustic ultrasound wave.

The resonator 5 has a generator 6 for the acoustic standing wave. This is part of the resonator 5. In contrast, the generator 6 can also be formed by a piezo-element which is connected to the resonator 5 (not shown in the Figs.). The generator 6 as shown in FIG. 1 has a three-layer structure, wherein one layer represents the exciter electrode 7 and one layer the general electrode 8, and a layer of piezoelectric ceramic 9 is arranged between the exciter electrode 7 and of the general electrode 8. The polarisation vector of the piezoceramic layer is aligned perpendicular to the electrodes 7, 8, as also shown in illustration 10 of FIG. 1. However, it is also conceivable that the polarization vector of the piezoceramic layer is inclined relative to the electrodes 7, 8 (illustration 11 of FIG. 1) or parallel to the electrodes 7, 8 (illustration of FIG. 1). Furthermore, it is conceivable that the polarization vector has different alignments in different regions of the generator 6. It is also conceivable in this case that in one region the polarization vector has a vertical alignment, and in another section also has a vertical alignment, but in the opposite orientation, i.e. an antiparallel orientation.

It is possible for the generator 6 to have a multilayer structure, in which the electrodes 7, 8 and the piezoceramic layer 9 are arranged alternately, as is shown in illustration 13 of FIG. 1. In this case the various different orientations of the polarization vector described in the previous section are conceivable in the individual layers.

In addition, the standing wave generator can have strip-like electrodes (not shown in the Figs.).

To apply an electrical voltage, the electrodes 7 and 8 have the outputs 14, 15. The outputs 14, 15 are implemented as stranded-wire conductors, but they can also be implemented as spring elements or electrically conducting rubber elements.

The electrical capacitance $C_0$ is present between the electrodes 7 and 8 of the generator 6.

The generator 6 is used to generate an acoustic ultrasonic standing wave in the resonator 5, which is used by the ultrasonic motor for its operation. This wave can be a longitudinal wave, a flexural wave, a shear wave, a torsional wave, a volume wave, a plane wave, a surface wave, a symmetric, asymmetric or a different type of acoustic wave. The type and shape of the wave used are determined by the geometric shape of the resonator 5, the shape of the electrodes 7 and 8, the orientation of the polarization vector of the piezoelectric ceramic in relation to the electrodes 7 and 8, and the frequency of the excitation voltage $U_g$.

In the wave generated in the actuator 2, at the frequency equal to the mechanical resonant frequency $F_m$, the points of the resonator 5 have their peak vibration velocity $V_p$. The mechanical resonant frequency $F_m$ represents the operating frequency of the ultrasonic actuator 2 and, accordingly, also that of the ultrasonic motor 1. At this frequency the ultrasonic motor 1 has optimal mechanical characteristic values.

Figure 6:
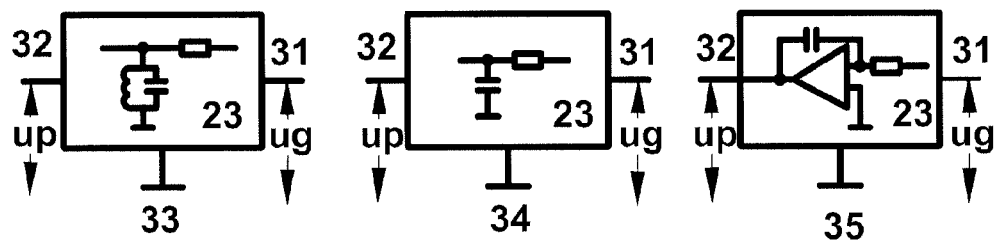
FIG. 6, 7: different embodiments of the impulse filter
Figure 7:
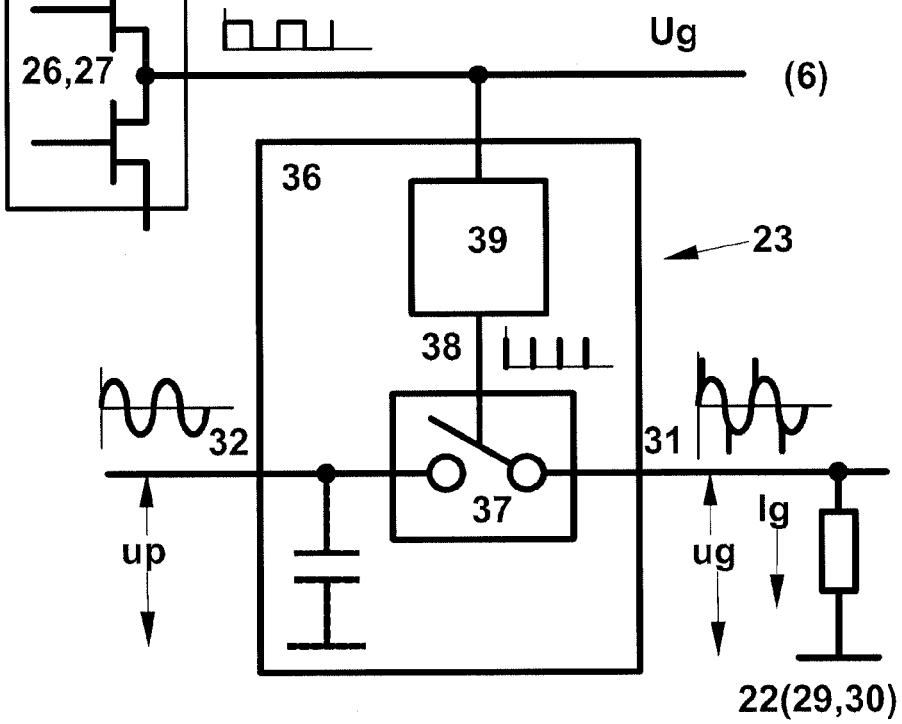

The electrical excitation device 20 has a power amplifier 21, a feedback element 22, an impulse filter 23 for the voltage $u_g$ supplied by the feedback element 22, and a control voltage shaping device 24. The power amplifier 21 is implemented as a voltage selector switch 25. In this case, the voltage selector switch can form a half-bridge or bridge power amplifier 26, or a dual-clock power amplifier 27 form. The power amplifier 21 is fed by the DC voltage E and provides the rectangular AC voltage $U_g$ (see illustration 42 of FIG. 10). The outputs 14 and 15 of the electrodes 7, 8 of the generator of the acoustic wave 6 are connected to the power amplifier 21 via the feedback element 22. The impulse filter 23 has the input 31, at which the voltage $U_g$ is applied, and the output 32, at which the voltage $u_p$ is applied. The impulse filter 23 is designed as a bandpass filter 33. However, it can also be designed as a low-pass filter 34 or as an integrator 35 (see FIG. 6). In addition, the impulse filter 23 can be a comparator or an impulse device 36 (see FIG. 7). Such a filter can contain a circuit breaker 37 for the voltage $u_g$ provided by the feedback element 22, the control input 38 of which is connected to the voltage selector 21 via the edge detector 39. In addition, the impulse filter 23 can be composed of passive or active electronic components, or be implemented with freely programmable microcontrollers.

Figure 14:
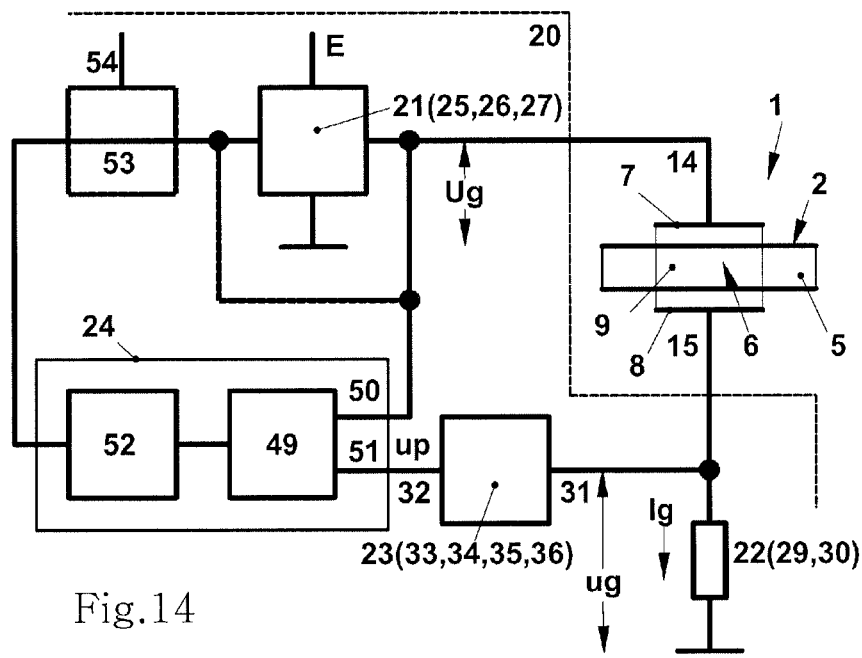

The feedback element 22 is used for the converting the current $I_g$ flowing through the generator 6 into an electrical voltage $u_g$ which varies proportionally to this current. It is implemented as a low-valued resistance 29, but can also be realized as a measuring transformer for current-voltage 30 (see FIG. 14), or in a different design.

Figure 2:
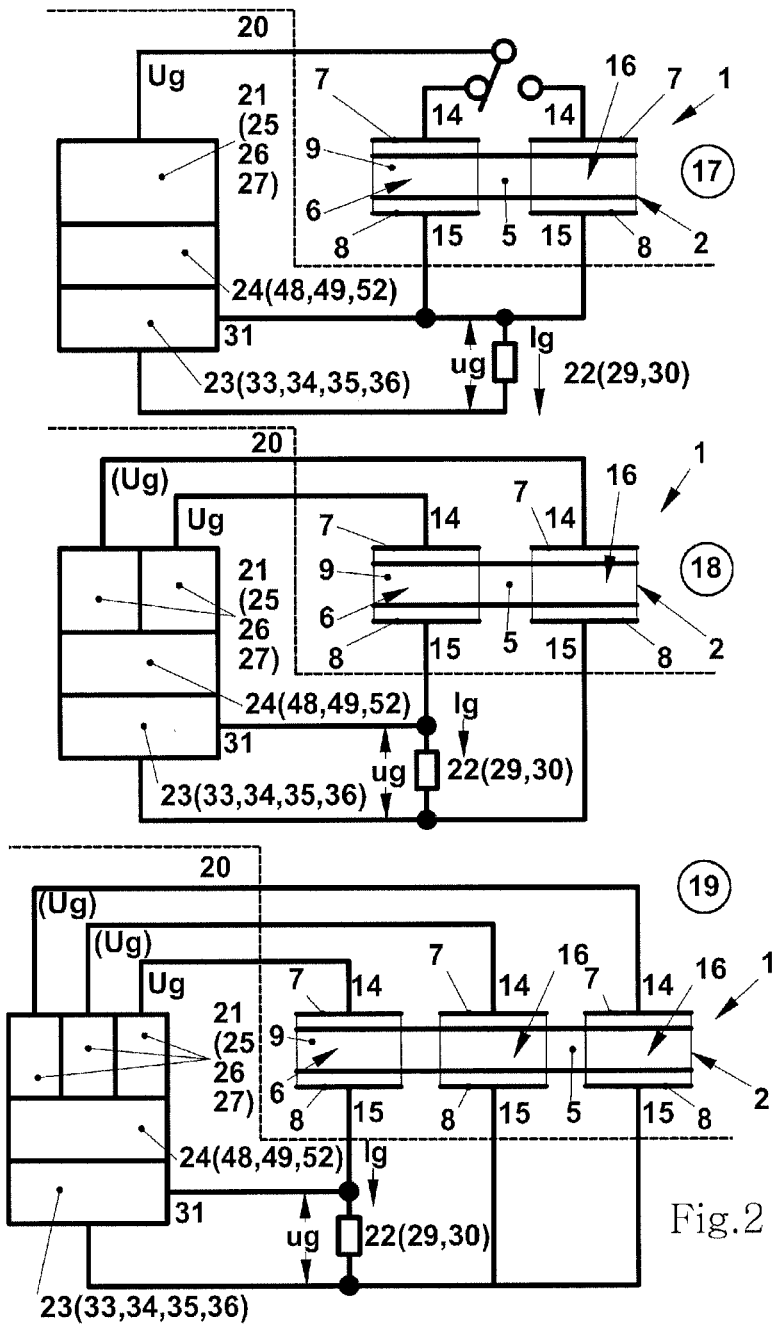
FIG. 2: excitation device according to the invention (illustrations 17 to 19: single-phase and multi-phase driving of the actuator)
Figure 3:
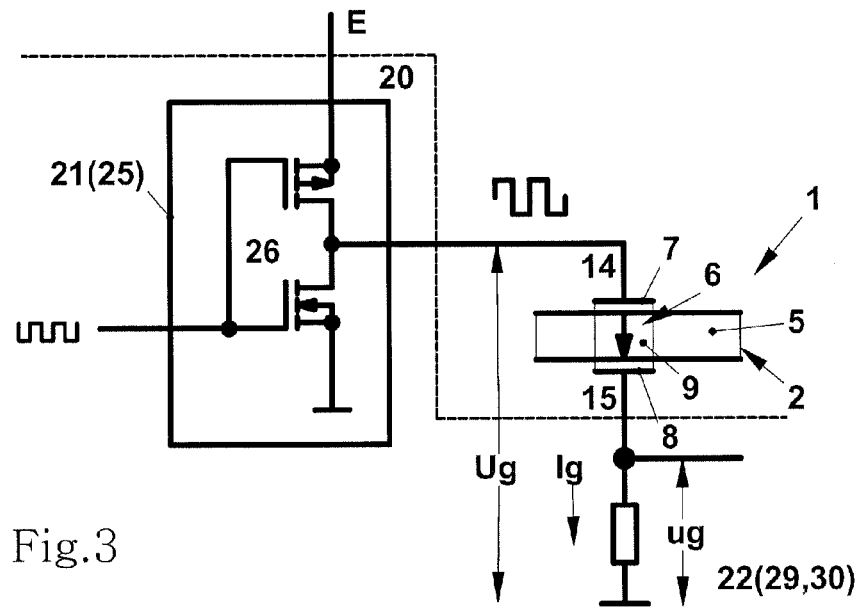
FIG. 3-5: embodiments of the excitation device according to the invention

In accordance with the illustrations 17 to 19 of FIG. 2 the resonator 5 can have one or more supplementary generators 16 for an acoustic wave with the electrodes 7 and 8. The supplementary generators 16 can be driven using the rectangular voltage $U_g$, or with a different voltage with any non-rectangular shape. The supplementary generators 16 in the actuator 2 can generate an acoustic ultrasound wave of the same type as the (main) generator 6; however, they can also produce an acoustic ultrasound wave of a type other than that of the (main) generator 6. In addition, the supplementary generators 16 can have the same mechanical resonance frequency as $F_m$ or a different one, e.g. $F_z$. In addition, the supplementary generators 16 can have a capacitance which differs from the capacitance $C_0$ of the generator 6, e.g. $C_z$.

In accordance with illustration 17 of FIG. 2 the actuator 2 can be single-phase and in accordance with illustration 18 of FIG. 2, biphase. A corresponding three-phase design is shown in illustration 19 of FIG. 2. Of course, controlling the device with more than three phases is also conceivable.

If the generators 6 and 16 are excited jointly, two, three or more standing waves can propagate independently of each other in the actuator 2. The standing waves propagating in the actuator 2 can be pure travelling waves or a combination of travelling and standing waves.

Figure 4:
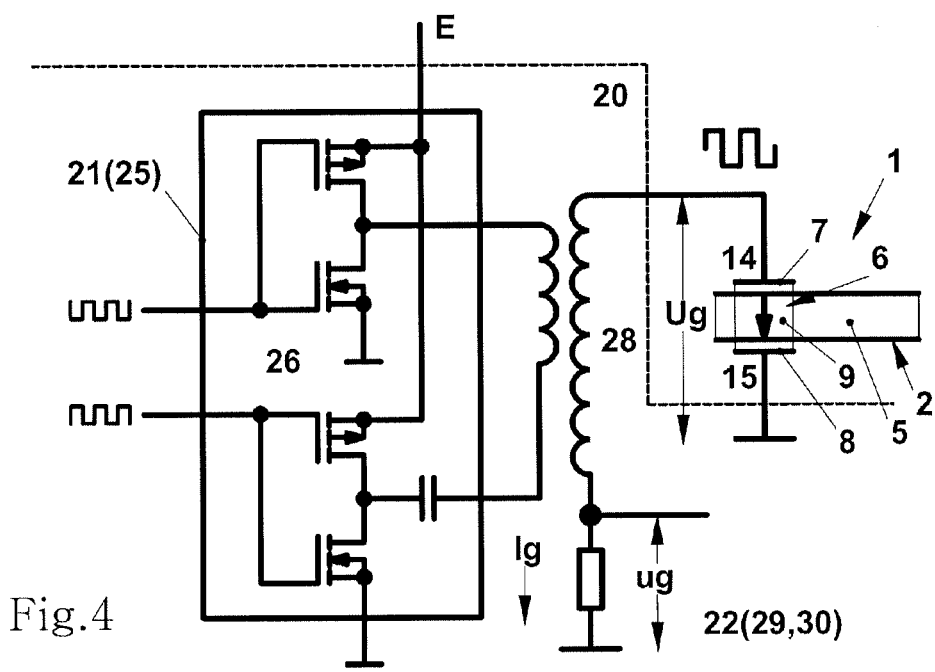
Figure 5:
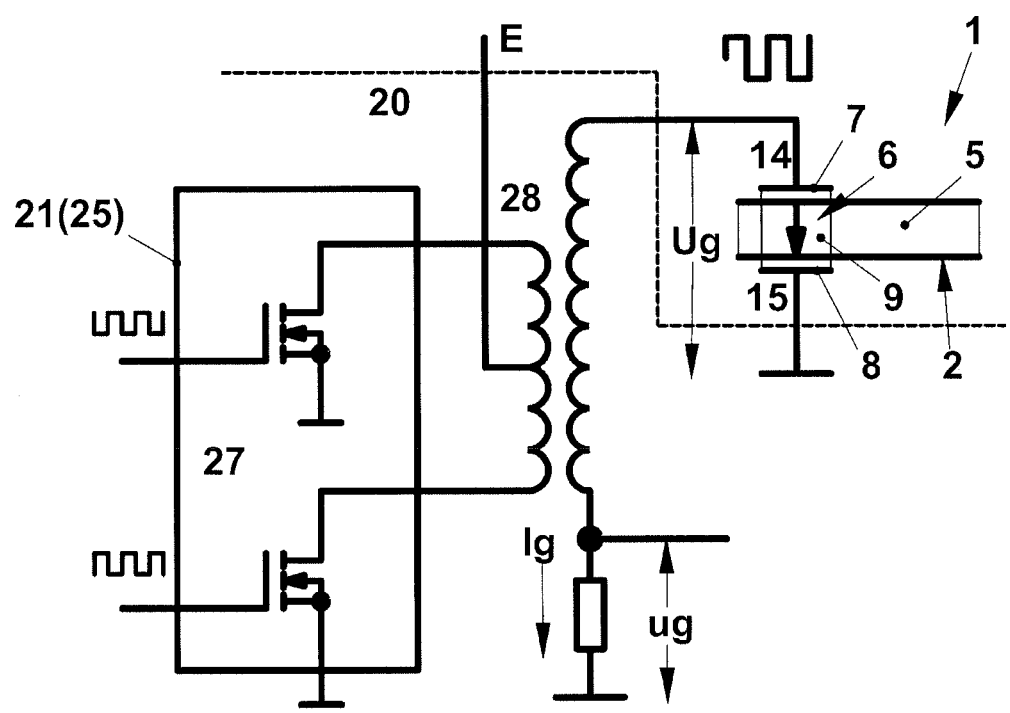

In accordance with FIG. 4 and FIG. 5 the outputs 14 and 15 of the electrodes 7, 8 of the standing wave generator 6 are connected to the power amplifier 21 via the matching transformer 28.

Figure 8:
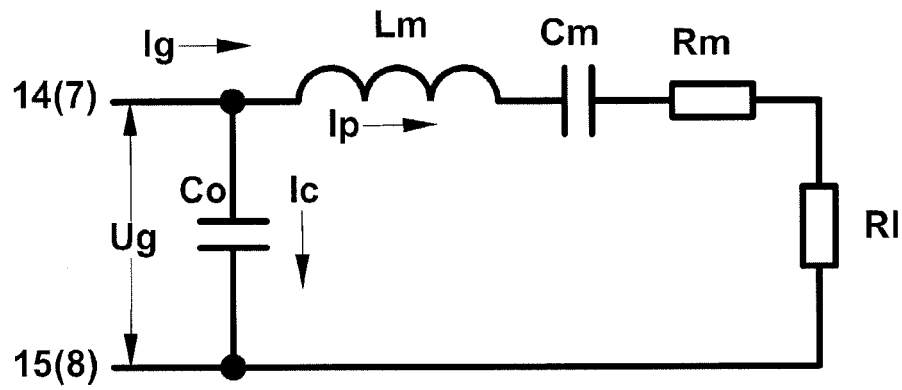
FIG. 8: Equivalent circuit for the standing wave generator

FIG. 8 shows an equivalent circuit to illustrate the electromechanical parameters of the standing wave generator 6 for the ultrasonic motor 1 in the region of the mechanical resonant frequency $F_m$. The symbols in this circuit have the following meanings: $C_0$=electrical capacitance which is formed between the electrodes 7 and 8; $L_m$=electrical inductance, which is proportional to the mass of the actuator 2; $C_m$=electrical capacitance, which is proportional to the elastic compliance of the actuator 2; $R_m$=electrical resistance, which is proportional to the mechanical losses in the actuator 2; $R_l$=electrical resistance which is proportional to the mechanical resistance of the load on the actuator 2.

The circuit has the electrical voltage $U_g$ applied to it, which causes the current $I_g$ to flow through the circuit. This current flows via the outputs 14, 15, and the electrodes 7, 8 of the standing wave generator 6.

The current $I_g$ is a total current formed from the following two components: $I_c$=charging and discharging current of the electrical capacitance $C_0$ of the generator 6, and $I_p$=piezoelectric current, defined by the angle of rotation of the domains of the piezoelectric ceramic layer 9 of the generator 6, which reflects the vibration velocity $V_p$ (or the vibration amplitude) of the generator 6.

If the voltage $U_g$—contrary to the idea of the present invention—is a sinusoidal voltage, the currents $I_g$, $I_g$ and $I_p$ ($V_p$) also have a sinusoidal waveform. In this case the amplitude of the current $I_g$, and the amplitude of the current $I_p$ ($V_p$) have the relationship shown in illustration 40 of FIG. 9. The display 41 in FIG. 9 shows the dependency of the phase shift of the voltage $U_g$ and current $I_g$ on frequency.

Figure 9:
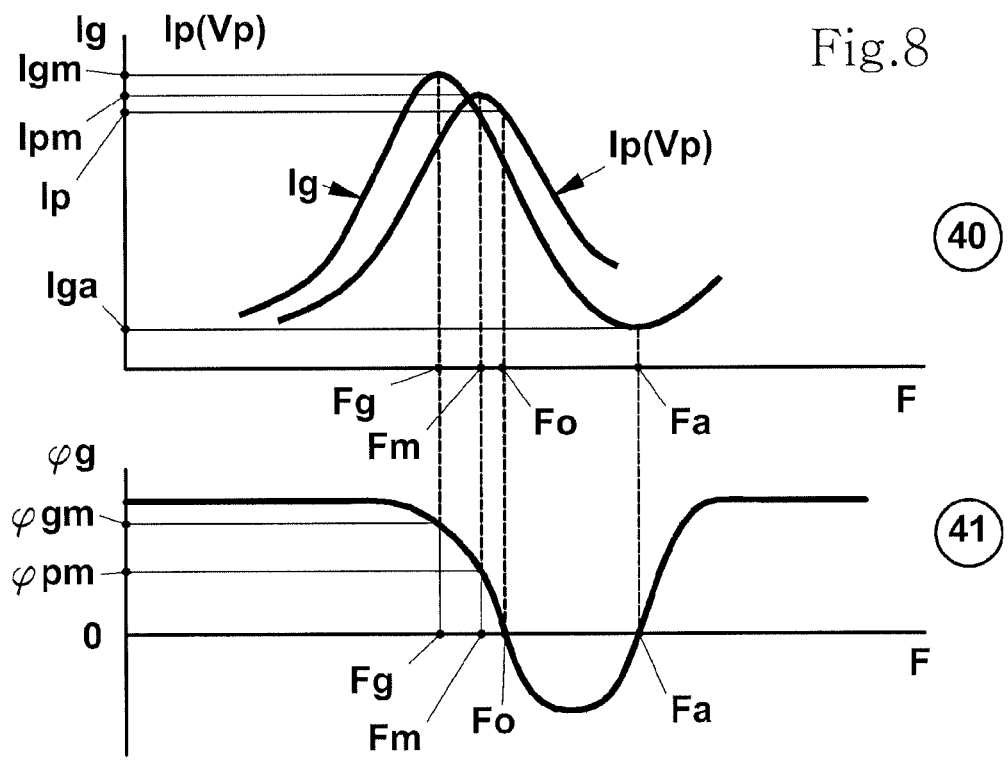
FIG. 9: Frequency dependence of the currents (FIG. 40) and the phase differences (illustration 41) of the ultrasonic wave generator for the excitation device according to the invention

In illustrations 40 and 41 of FIG. 9 particular frequencies can be identified. Of these, $F_g$ is the resonance frequency of the current $I_g$. At this frequency, the current $I_g$ has its maximum value $I_{gm}$ and the phase shift angle $\phi_g$ is equal to $\phi_{gm}$. $F_m$ is the mechanical resonant frequency of the current $I_p$ ($V_p$). At this frequency, the current $I_p$ ($V_p$) has its maximum value $I_{pm}$ and the phase shift angle $\phi_g$ is equal to $\phi_{pm}$. $F_0$ is the frequency at which the phase shift for the current $I_g$ is equal to zero. $F_a$ is the antiresonant frequency of the current $I_g$. At the frequencies $F_0$ and $F_a$ the phase shift angle $\phi_g$ is equal to zero.

The basis of the method for exciting the actuator of the ultrasonic motor according to U.S. Pat. No. 5,872,418, in contrast to the method according to the invention, is precisely that—as previously described—a sinusoidal electrical voltage $U_g$ is applied to the actuator, and the frequency regulation of this voltage is effected by stabilization of the phase shift $\phi_{pm}$ between this voltage and the current $I_g$ flowing through the actuator.

Because at the frequency $F_m$ the inductance $L_m$ is compensated by the capacity $C_m$, the phase shift angle $\phi_{pm}$ is determined by the capacity $C_0$ and the sum of the resistors $R_m+R_l$. The resistance $R_m$ is substantially smaller than the resistance $R_l$. For this reason, a change in the resistance of the load $R_l$ results in a change in the angle $\phi_{pm}$ for the frequency $F_m$.

Consequently, in the solution according to U.S. Pat. No. 5,872,418, a change in the load ($R_l$) acting on the actuator of the ultrasonic motor leads to a destabilization of the frequency of the excitation voltage $U_g$. This frequency therefore differs from the mechanical resonant frequency $F_m$. In the case of larger loads acting on the actuator the, the destabilization can attain a significant order of magnitude which is detrimental to the operation of the ultrasonic motor.

Figure 10:
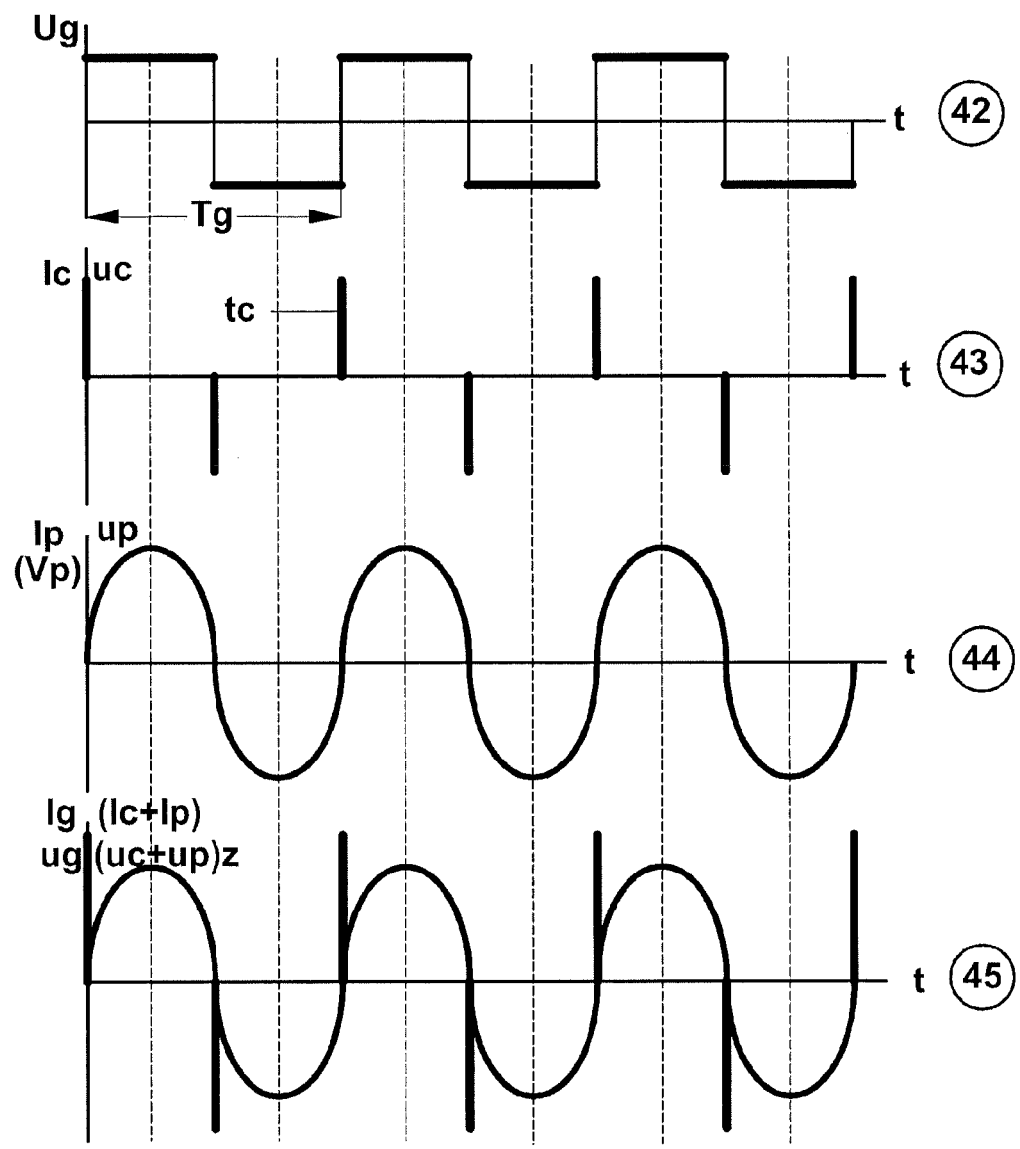
FIG. 10: Illustrations 42-45: time dependence of the various electrical voltages and currents

In the solution according to the invention on the other hand, an electrical rectangular voltage $U_g$ is applied to the generator 6 of the actuator 2, the form of which is shown in illustration 42 of FIG. 10. The leading and trailing edges of this voltage pulse each cause a rapid charging and discharging of the capacitance $C_0$. The charging and discharging of the capacitance $C_0$ takes place in a very short time $T_c$, and is several times smaller than the period $T_g$ of the excitation voltage $U_g$. This time is determined by the small resistance of the conducting transistor of the amplifier 26 and the size of the capacitance $C_0$. Therefore, the current $I_c$ represents a series of short pulses, as can be seen from illustration 43 of FIG. 10. The current pulses $I_c$ coincide with the edges of the pulses of the rectangular voltage $U_g$.

As well as the current $I_c$, the piezoelectric current $I_p$ also flows through the generator 6, which is proportional to the vibration velocity $V_p$. Since the generator 6 is part of the acoustic resonator 5, the current $I_p$ has a sinusoidal waveform (see illustration 44 of FIG. 10).

The total current $I_g$ consists of the current $I_c$ and the current $I_p$, which flows through the electrodes 7, 8 of the generator 6 (see illustration 45 of FIG. 10).

Because at the mechanical resonant frequency $F_m$ the inductance $L_m$ is compensated by the capacitance $C_m$, at this frequency the current $I_p$ represents an active current, or effective current, i.e. the phase shift of the current—relative to the rectangular excitation voltage $U_g$—is zero.

From the above it follows that when the generator 6 is excited according to the invention with a rectangular voltage $U_g$ of frequency $F_m$, a change in the load resistance $R_l$ does not lead to a change in the phase of the current $I_g$, i.e. the phase difference remains equal to zero.

Figure 11:
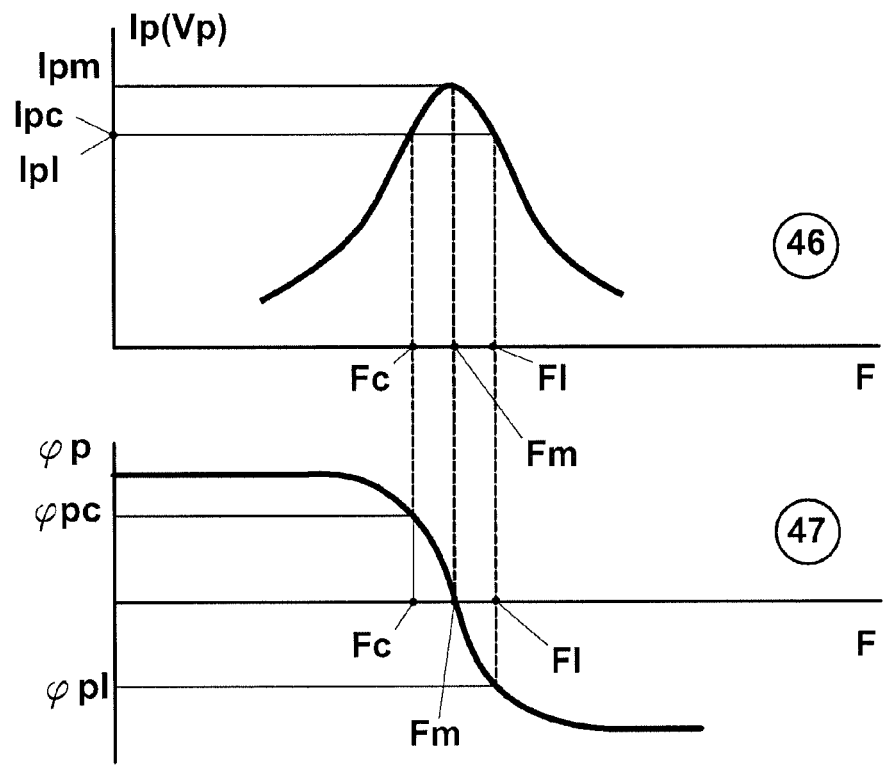
FIG. 11: Frequency dependencies of the ultrasonic wave generator
Figure 12:
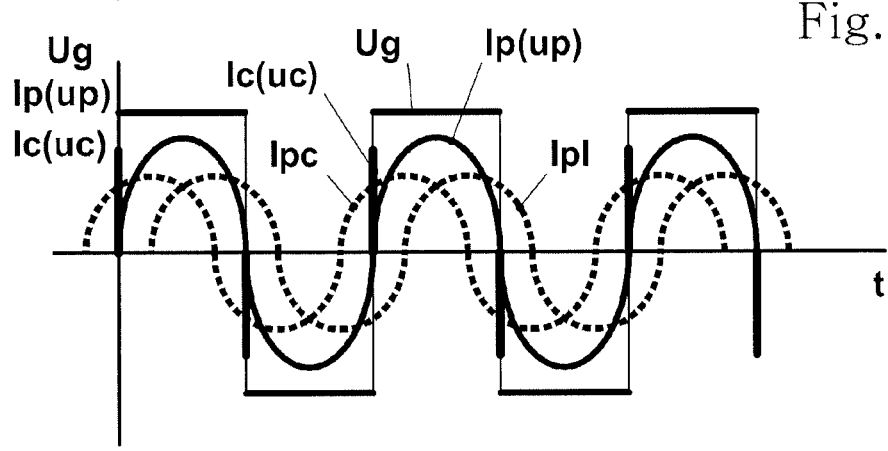
FIG. 12: Phase shift between current and voltage when the frequency of the excitation voltage is changed

If the frequency of the excitation voltage $U_g$ is reduced from $F_m$ to $F_c$, the current $I_{pc}$ of the voltage $U_g$ starts to lead by the angle $\phi_{pc}$, i.e. the piezoelectric current takes on a capacitive character. If the frequency of the excitation voltage is increased from $F_m$ to $F_i$ the current $I_{pi}$ of the voltage $U_g$ begins to lag behind the angle $\phi_{pi}$, i.e. the piezoelectric current takes on an inductive character (see also FIG. 11, 12). The dependence of the phase shift of the piezoelectric current $I_p$ ($V_p$) on the frequency F over the whole range is a smooth and single-valued function, as is clear from illustration 47 of FIG. 11.

From the point of view of its structure the electrical excitation device 20 of the invention forms a system for regulating the frequency of the excitation voltage $U_g$, and to this end, it uses the stabilisation of the phase shift angle between the rectangular excitation voltage $U_g$, and the piezoelectric current $I_p$.

Figure 13:
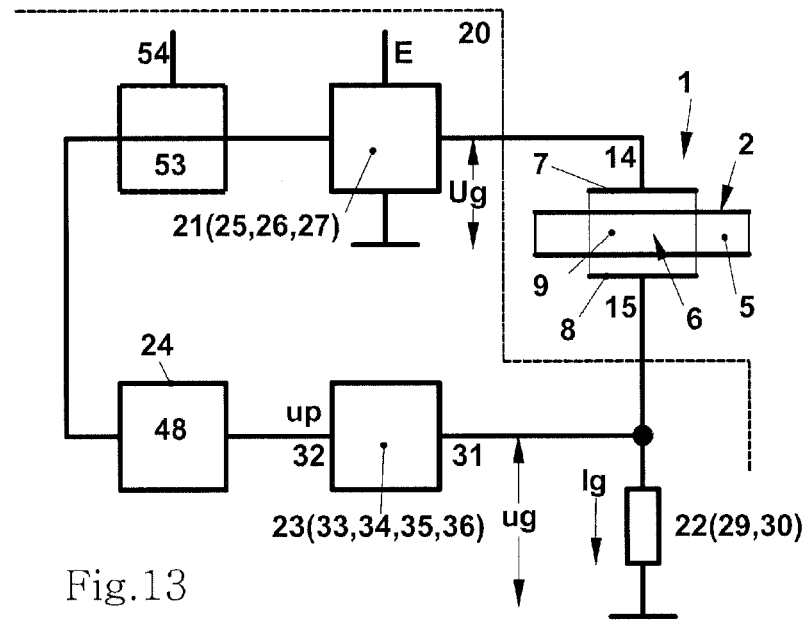
FIG. 13-17: further embodiments of the excitation device according to the invention

Various different principles are conceivable for the frequency regulation. For example, the excitation device 20 can be an autogenerator with positive feedback, wherein at the frequency $F_m$ the phase shift angle in the feedback loop is equal to zero and the gain coefficient is greater than one. In this case, the control voltage shaping device 24 is implemented as a limiting amplifier 48 (see FIG. 13).

The excitation device 20 can also be a PLL system for frequency regulation with negative feedback. In this case, the control voltage shaping device 24 consists of a phase detector 49 with a reference input 50 and a measurement input 51, and a controlled generator 52 (see FIG. 14).

Regardless of the principle applied for the frequency regulation, the electrical excitation device 20 comprises a symmetrical PWM modulator 53 with a control input 54, wherein the excitation voltage $U_g$ represents a width-modulated rectangular voltage.

Figure 15:
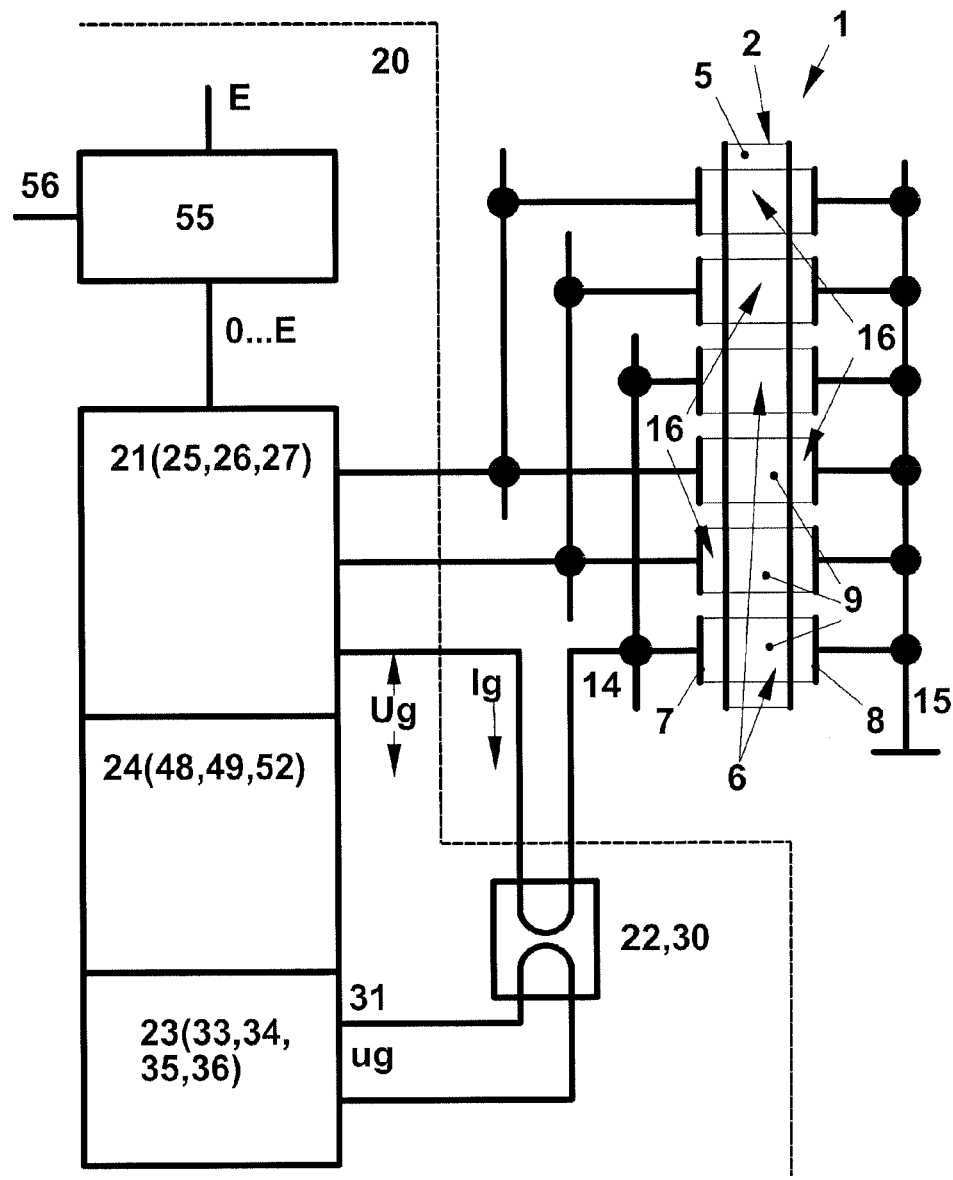

FIG. 15 shows an electrical excitation device 20, which contains a regulator 55 for the electrical supply voltage E, which represents the voltage supply for the power amplifier 21 with a control input 56. This regulator 55 may be implemented, for example, as a DC-DC converter, which operates as a PWM modulator.

Figure 16:
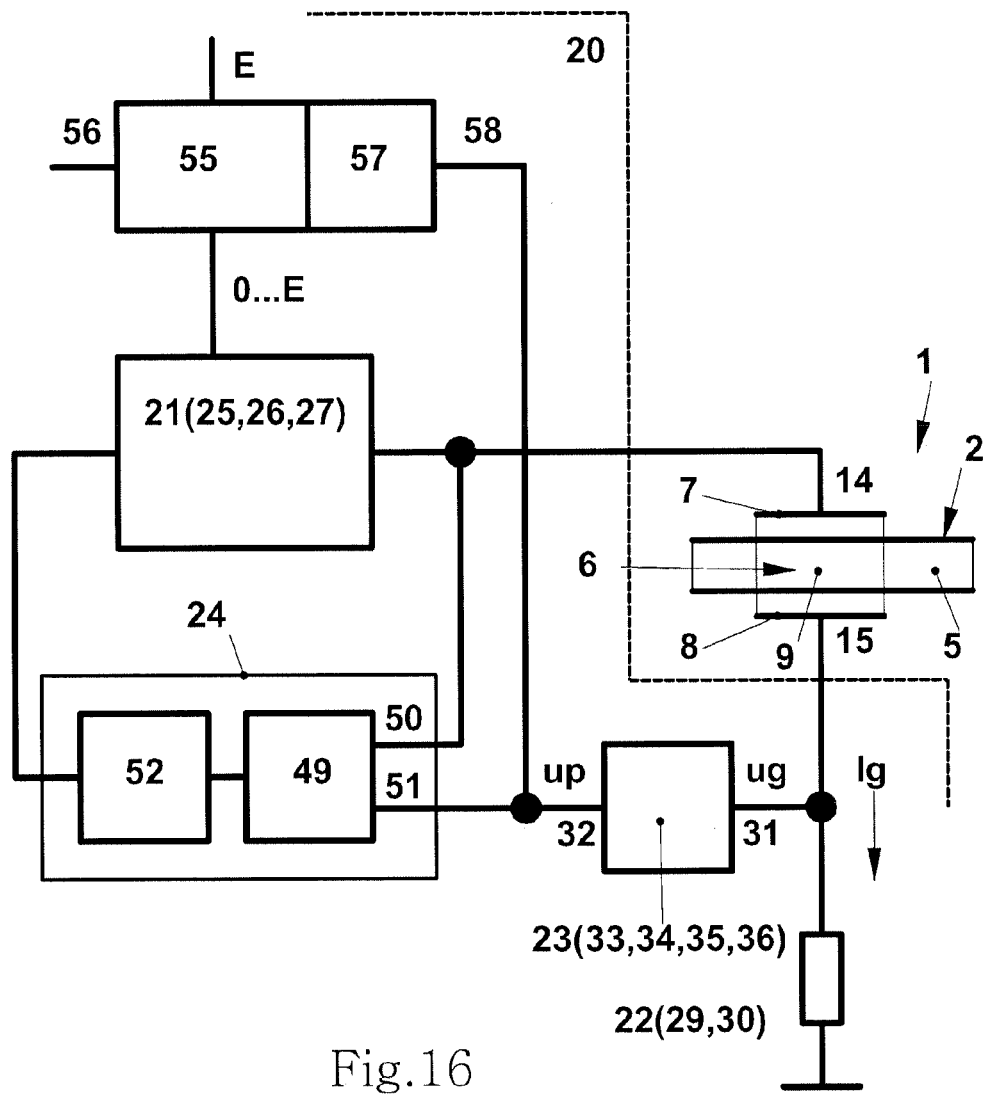

FIG. 16 shows a variant of the electrical excitation device 20, which has a stabilization system 57 for the piezoelectric current $I_p$ flowing through the standing wave generator 6. To this end, the stabilizing system 57 has a measuring input 58 connected to the output 32 of the impulse filter 23.

Figure 17:
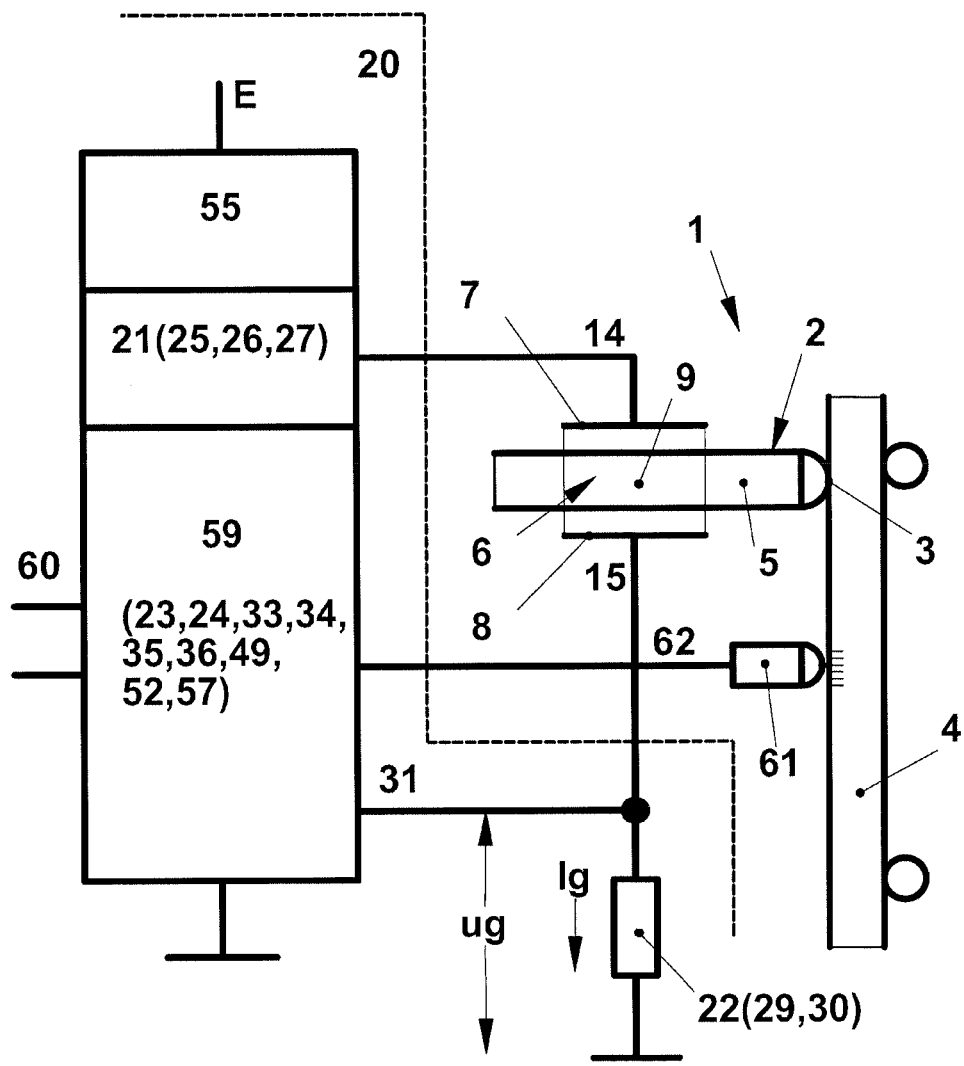

FIG. 17 shows an electrical excitation device 20, in which the function of the electrical components impulse filter 23, control voltage shaping device 24, bandpass filter 33, low-pass filter 34, integrator 35, impulse device 36, phase detector 49, controlled generator 52 and stabilization system 57 are implemented partly or completely by an appropriately programmed digital processor of the type DSP or FPGA. The digital processor 59 can have the interface port 60.

It is possible to equip the element 4 of the ultrasonic motor 1 to be driven with a position encoder 61, whose output 62 is connected to the digital processor 59.

Functional Description

The method according to the invention for electrically exciting the actuator 2 of the ultrasonic motor 1 is based on the fact that the electrical rectangular excitation voltage $U_g$ is applied to the exciter electrode 7 and the general electrode 8 of the main generator 6 for the acoustic ultrasound standing wave of the actuator 2, the frequency F of which initially differs slightly from the mechanical resonant frequency $F_m$ of the actuator 2. Then the feedback element 22 taps off the electrical voltage $u_g$, which is proportional to the current $I_g$ flowing through the generator 6 of the actuator 2. After this, by means of the impulse filter 23 the voltage $u_p$, which is proportional to the piezoelectric current $I_p$, is separated from the voltage $u_c$, which is proportional to the charging and discharging current $I_c$ of the capacitance $C_0$. Next, the frequency F of the rectangular excitation voltage $U_g$ is changed such that the phase difference $\phi_p$ between the piezoelectric current $I_p$ and the rectangular excitation voltage $U_g$ approaches the value zero or becomes equal to zero. The piezoelectric current $I_p$ flowing through the generator 6 for the acoustic standing wave of the actuator 2 can therefore be stabilized.

The electrical excitation device 20 of the actuator of the ultrasonic motor 1 according to the invention works as follows: when the supply voltage E is applied the power amplifier 21 (25, 26, 27) provides an electrical rectangular excitation voltage $U_g$, the frequency F of which differs slightly from the mechanical resonant frequency $F_m$ of the actuator 2. This voltage is applied to the outputs 14, 15 of the electrodes 7, 8 of the generator 6. The result of the voltage is that the current $I_g$ starts to flow through the generator 6 and the feedback element 22 (29, 30). At the feedback element 22 (29, 30) the voltage $u_g$ is present, which is proportional to the current $I_g$. Due to the impulse filter 23 (33, 34, 35, 36) the voltage $u_p$ is separated from the voltage $u_g$, wherein $u_p$ behaves proportionally to the piezoelectric current $I_p$ and $u_c$ is proportional to the charging and discharging current $I_c$ of the capacitance $C_0$.

The voltage $u_p$ represents a sinusoidal voltage, the phase of which at the mechanical resonant frequency $F_m$ matches the phase of the rectangular excitation voltage $U_g$ (or is shifted by 180 degrees). The frequency-phase characteristic of the voltage $u_p$—relative to the rectangular excitation voltage $U_g$—is represented by a smooth and single-valued function.

Provided that the electrical excitation device is implemented as an autogenerator 20, when the supply voltage E is switched on a pulsed current flows through the generator 6, so that as a result, the electrical excitation device 20 is set into oscillation at the mechanical resonant frequency $F_m$. Because at the mechanical resonant frequency $F_m$ the phase shift angle relative to the feedback element 22 is zero and this angle does not depend on the load on the actuator, whatever the load on the actuator 2 the electrical excitation device 20 vibrates at the mechanical resonant frequency $F_m$.

If the electrical excitation device 20 is a PLL system for frequency regulation with negative feedback, this system stabilizes the phase shift angle $\phi_p$ between the electrical rectangular voltage $u_g$ and the voltage, i.e. the piezoelectric current $I_p$, such that $u_p$ is equal to zero. The electrical excitation device 20 then provides the voltage $U_g$, the frequency of which is always equal to the mechanical resonant frequency $F_m$ under any load on the actuator 2.

The additional stabilization of the piezoelectric current $I_p$ using the stabilization system 57 also allows the vibration velocity $V_p$ to be stabilized, and thus also the velocity of motion of the element 4 to be driven.

By the use of half-bridge or bridge amplifiers 26, or dual-clock power amplifiers 27, it is possible, to maximally reduce the internal resistance of the selector 25 and thus to maximally reduce the pulse duration $t_c$ of the capacitive current $I_c$.

By the use of a low-valued resistance 29 or a measuring transformer 30 as the feedback element 22 is it possible to maximally reduce the phase error in the conversion of the current $I_g$ into the voltage $u_g$.

The implementation of the impulse filter 23 as a bandpass filter 33 enables the phase error at the mechanical resonant frequency $F_m$ to be eliminated, while the design of the impulse filter 23 as a low-pass filter 34 or as an integrator 35 enables these filters to be designed extremely simply.

By the design of the impulse filter 23 as an impulse device 36 it is possible to eliminate the phase error in the entire operating frequency range of the excitation device 20.

By using a symmetrical PWM modulator 53 or a regulator for the electrical supply voltage in the electrical excitation device 20 it is possible to regulate the current $I_p$ ($V_p$), and hence the velocity of motion of the element 4 to be driven.

The implementation of the electronic components as a digital processor 59 makes it possible to simplify the electrical excitation device 20 and its structure, to reduce its costs and to increase its interference immunity.

The method according to the invention and the device according to the invention enable the frequency of the excitation voltage to be maintained at the optimal value for the ultrasonic actuator. This frequency is maintained constantly at a value equal to the mechanical resonant frequency of the actuator, independently of the loads applied to the actuator of the ultrasonic motor. This increases the operational stability of the ultrasonic motor. Because the ultrasonic motor is always operating in an optimal operating range, the size of the excitation voltage, and the current, or power, required for its operation are reduced. The motor heats up to a lesser degree, which extends its operating temperature range.

The invention claimed is:

1. Method for electrically exciting a piezoelectric actuator of an ultrasonic motor with a mechanical resonance frequency $F_m$, wherein the ultrasonic actuator has at least one acoustic standing wave generator, which comprises an exciter electrode and a general electrode, wherein between the exciter electrode and the general electrode an electrical capacitance $C_0$ is formed, comprising:
applying a rectangular excitation voltage $U_g$ to the exciter electrode and the general electrode of the at least one acoustic standing wave generator, wherein the frequency of the rectangular excitation voltage $U_g$ differs from the mechanical resonant frequency of the actuator $F_m$;
providing an electrical voltage $u_g$ by means of a feedback element, wherein the electrical voltage $u_g$ is proportional to a current $I_g$ flowing through the standing wave generator, which is a total current formed from the sum of a piezoelectric current $I_p$ and a charging and discharging current $I_c$ of the electrical capacitance $C_0$;
separting an electrical voltage $u_p$ from an electrical voltage $u_c$ by means of an impulse filter, wherein the electrical voltage $u_p$ is proportional to the piezoelectric current $I_p$, and the electrical voltage $u_c$ is proportional to the charging and discharging current $I_c$ of the electrical capacitance $C_0$; and
changing the frequency of the rectangular excitation voltage such that the phase shift between the piezoelectric current $I_p$ and the rectangular excitation voltage $U_g$ is substantially zero.

2. Method of claim 1, wherein the piezoelectric current $I_p$ flowing through the standing wave generator is additionally stabilized.

3. Device for electrically exciting a piezoelectric actuator of an ultrasonic motor, wherein the actuator has at least one acoustic standing wave generator, comprising at least one power amplifier, a feedback element, a filter, and a control voltage shaping device, wherein the at least one power amplifier is implemented as a voltage selector switch for a supply voltage of the actuator and to which the at least one acoustic standing wave generator is directly or indirectly connected, wherein the feedback element is connected in series with the acoustic standing wave generator, so that the same current flows through the feedback element as through the standing wave generator, and the filter is implemented as an impulse filter of the electrical voltage which is generated by the feedback element, and furthermore the output of the filter is connected to an input of the control voltage shaping device, wherein the control voltage shaping device comprises a phase detector and a controlled generator for a rectangular wave, which device is connected to an input of the at least one power amplifier.

4. Device according to claim 3, wherein the voltage selector switch is implemented as a half-bridge power amplifier or as a bridge power amplifier or as a dual-clock power amplifier.

5. Device according to claim 4, wherein the feedback element has is implemented as a low-valued effective resistance or as a measurement transformer for an electrical current.

6. Device according to claim 3, wherein the impulse filter is implemented as a bandpass filter, tuned to the mechanical resonant frequency $F_m$ of the actuator, for the voltage generated by the feedback element.

7. Device according to claim 3, wherein the impulse filter is implemented as a low-pass filter or as an integrator for the voltage generated by the feedback element.

8. Device according to claim 3, wherein the impulse filter comprises a circuit breaker for the voltage generated by the feedback element, and a control input of the impulse filter is connected to the voltage selector switch via an edge detector.

9. Device according to claim 3, wherein the impulse filter is implemented as a voltage comparator.

10. Device according to claim 9, wherein said device is implemented as an autogenerator.

11. Device according to claim 3, wherein the control voltage shaping device has a symmetrical PWM modulator.

12. Device according to claim 3, wherein said device has a regulator for the electrical voltage which feeds the power amplifier.

13. Device according to claim 3, wherein said device has a stabilization system for the piezoelectric current flowing through the standing wave generator.

14. Device according to claim 3, wherein the electronic components thereof are partially or completely realised by a programmable digital processor of the type DSP or FPGA.

* * * * *

UNITED STATES PATENT AND TRADEMARK OFFICE
CERTIFICATE OF CORRECTION

| | | |
|---|---|---|
| PATENT NO. | : 9,479,088 B2 | Page 1 of 1 |
| APPLICATION NO. | : 13/877235 | |
| DATED | : October 25, 2016 | |
| INVENTOR(S) | : Wischnewskiy et al. | |

It is certified that error appears in the above-identified patent and that said Letters Patent is hereby corrected as shown below:

In the Claims

Claim 1; Column 11; Line 20 please amend:
"separting an electrical voltage" to --separating an electrical voltage--

Claim 5; Column 12; Line 14 please amend:
"element has is implemented as a low-valued" to --element is implemented as a low-valued--

Signed and Sealed this
Twenty-third Day of May, 2017

Michelle K. Lee
*Director of the United States Patent and Trademark Office*